May 21, 1935.  O. W. GREENE  2,002,242
FLUID NOZZLE
Filed Aug. 22, 1933   2 Sheets-Sheet 1

INVENTOR
Otto W. Greene
BY Edward H. Cumpston
his ATTORNEY

May 21, 1935.　　　O. W. GREENE　　　2,002,242
FLUID NOZZLE
Filed Aug. 22, 1933　　　2 Sheets-Sheet 2
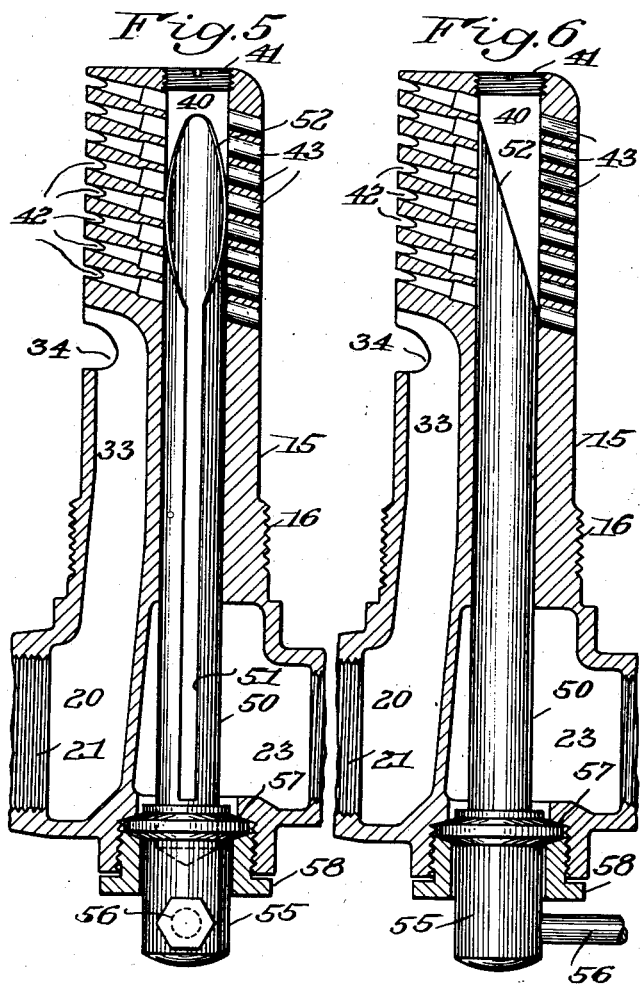
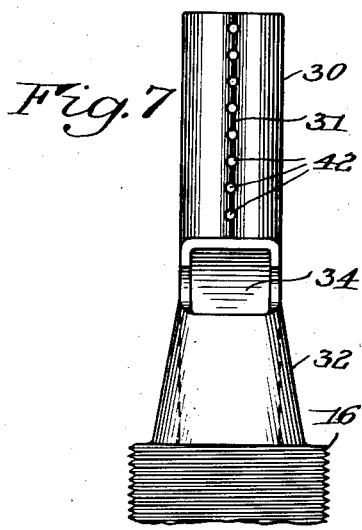
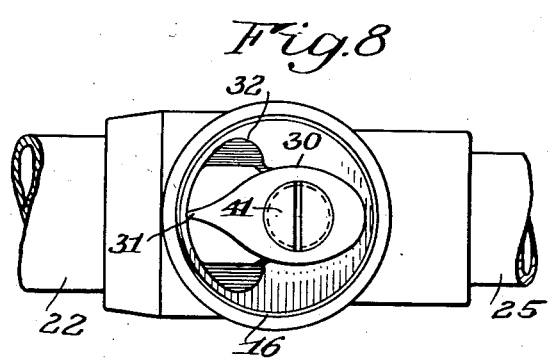
INVENTOR
Otto W. Greene
BY Edward H. Cumpston
his ATTORNEY Patented May 21, 1935

2,002,242

UNITED STATES PATENT OFFICE 2,002,242

FLUID NOZZLE

Otto W. Greene, Elyria, Ohio, assignor to The Pfaudler Co., Rochester, N. Y., a corporation of New York Application August 22, 1933, Serial No. 686,267

9 Claims. (Cl. 257—64)

This invention concerns a fluid nozzle such as is used, for example, for supplying water to a heating jacket of a processing receptacle and for introducing steam into the water to heat and circulate it.

An object of the invention is the provision of a generally improved and more satisfactory nozzle of the above mentioned kind.

Another object is the provision of such a nozzle in which simple and effective means is provided for varying the heating and circulating effect of the steam or other heating fluid.

Still another object is the provision of such a nozzle so designed and constructed that the heating and circulating effect may be varied by varying the number of jets or orifices from which steam is discharged.

A further object is the provision of a nozzle for discharging steam into water, so formed as to be capable of operating quietly, even when the steam is at relatively high pressure.

A further object is the provision of such a nozzle designed to offer a minimum of friction or obstruction to the liquid circulating past the nozzle.

A still further object is the provision of a nozzle of the above mentioned character so designed that it may be inserted through and attached in a single relatively small opening in a jacket or other wall through which the nozzle is to extend.

To these and other ends the invention resides in certain improvements and combinations of parts, all as will be hereinafter more fully described, the novel features being pointed out in the claims at the end of the specification.

In the drawings:

Fig. 4 is a vertical section substantially centrally through the nozzle showing the controlling means in one position for discharging steam through all of the steam ports in the nozzle;

Fig. 5 is a similar view with the controlling means turned to another position in which certain of the ports are blocked off or rendered ineffective while other ports may still discharge steam;

Fig. 6 is a similar view with the controlling means turned to another position blocking off all but one of the ports;

Fig. 7 is a front elevation of a part of the nozzle, and

Fig. 8 is a plan of the nozzle.

The same reference numerals throughout the several views indicate the same parts.

Figure 1:
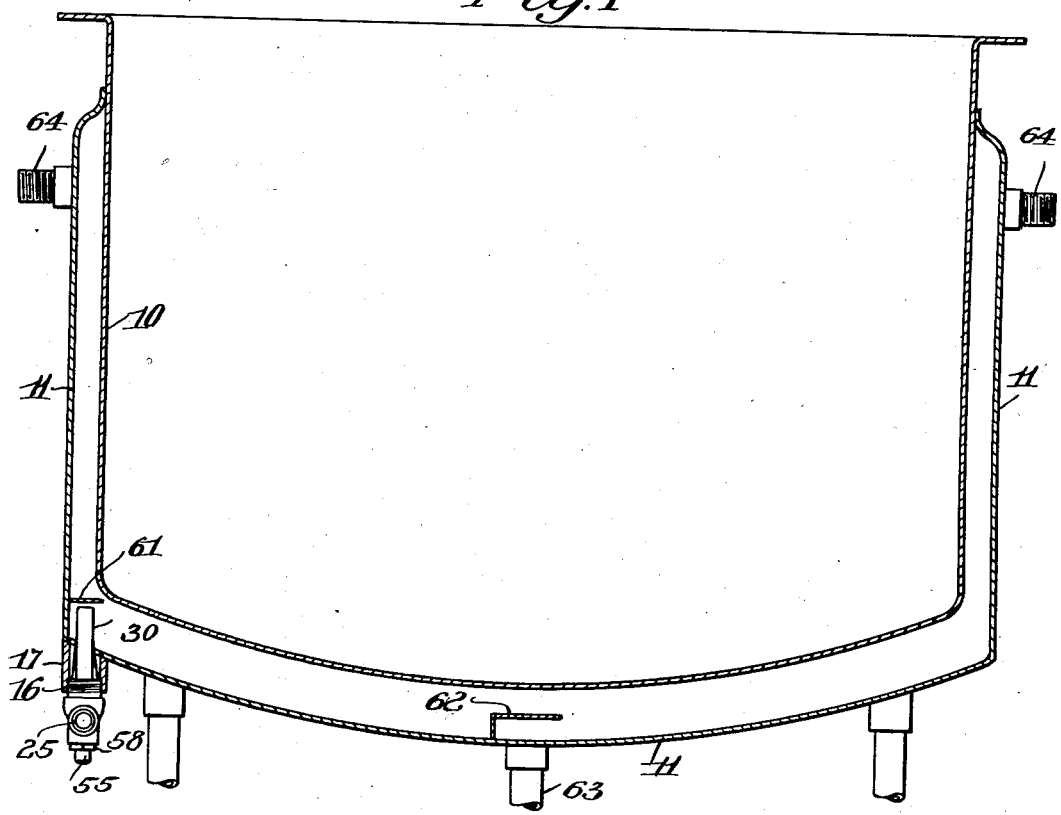
Fig. 1 is a diagrammatic vertical section taken substantially centrally through a processing receptacle illustrating a jacket surrounding a part of the receptacle and a nozzle constructed in a preferred form of the present invention applied to the jacket.
Figure 2:
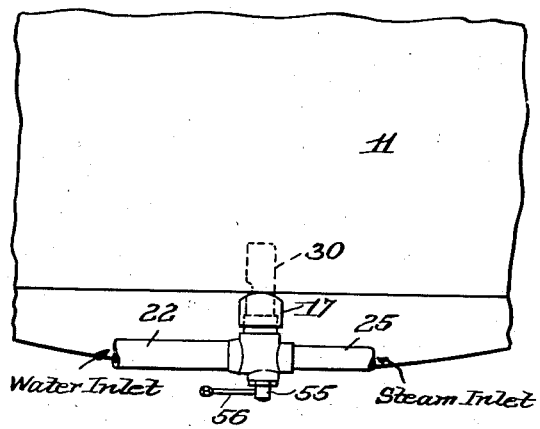
Fig. 2 is a side elevation of a fragment of the receptacle showing the nozzle.

Referring now to the drawings and particularly to Fig. 1 thereof, there is shown a processing receptacle or container indicated in general by the numeral 10, which may be of any suitable known construction. For heating or cooling the contents of the receptacle 10, there may be provided a jacket 11 surrounding part or all of the bottom and sides of the container 10, which jacket may have any suitable heating or cooling fluid applied thereto.

For many purposes, it is found to be advisable, when heating is desired, to fill the jacket 11 partially with water and to heat this water and circulate it by means of jets of steam introduced into the water. This may be done, for example, by means of a nozzle constructed in accordance with the preferred embodiment of the invention, which nozzle is adapted to supply both water and steam to the jacket, although obviously the nozzle is capable also of other uses in addition to this preferred use.

The nozzle of the preferred embodiment of the invention, illustrated particularly in Figs. 3 to 8 inclusive, comprises a main body 15 having a screw-threaded portion 16 which may be screwed into suitable threads in a collar 17 (Fig. 3) depending from the bottom of the jacket 11. A portion of the nozzle body projects downwardly from the threaded portion 16 and is provided with an inlet passageway 20 having a screw-threaded aperture 21 to which a pipe 22 may be connected for supplying the nozzle with water, for example, and another inlet passageway 23 having a screw-threaded aperture 24 to which a pipe 25 may be connected for supplying the nozzle with steam or other suitable heating fluid, for example.

Figure 3:
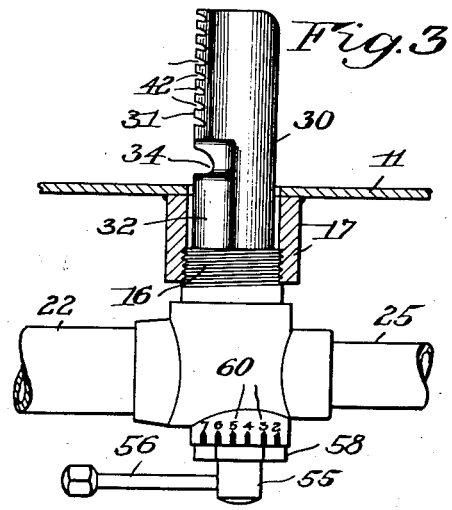
Fig. 3 is a side elevation of the nozzle on a somewhat larger scale than Fig. 2, with parts of the jacket in vertical section.

The nozzle also has a body portion extending upwardly above the screw-threaded part 16, and the upper part of this upwardly extending portion, as indicated at 30, is made of substantially stream-lined cross section as best shown in Fig. 8, having a rounded rear edge (toward the right hand side of Figs. 3 and 8) and a relatively thin fin-like front edge 31 (toward the left hand side of Figs. 3 and 8).

The rounded or stream-lined shape of the rear side of the upper part of the body is carried down practically to the screw threads 16, as seen in Figs. 3 and 8. But at the front there is a wider tapered portion 32 that extends upwardly about half way from the screw threads 16 toward the top of the body, and within this portion 32 is a passageway 33 leading upwardly from the passageway 20 and having an outlet orifice or port 34 opening at the front edge of the nozzle body, as shown in Figs. 4-6. The passageway 20, 33 may be conveniently described as the water passageway, although its usefulness is not necessarily limited to water.

A little to the rear of the middle of the nozzle, there is an upwardly extending bore or passageway 40 opening at its lower end into the passageway 23, which may be conveniently described as the steam passageway, although it might also be used for any other suitable heating fluid. If the bore 40 is drilled through the nozzle body, for example, its upper end may be closed by suitable means such as the screw plug 41. From the upper end of this bore, a series of outlet orifices or nozzle openings 42 lead forwardly and open along the forward thin edge or fin portion 31 of the nozzle body. It will be seen that the orifices 42 are preferably all arranged to extend in substantially the same direction and to lie substantially in a common vertical plane. The orifices may conveniently be formed by boring through from the rear side of the nozzle body, and the bores to the rear of the passageway 40 may subsequently be closed by any convenient means such as the plugs 43.

The stream-lined shape of the upper part of the nozzle, and the opening of the steam orifices along a relatively thin edge or fin, constitute important features of this invention and enable the nozzle to operate very quietly in comparison to prior nozzles, especially when relatively high pressure steam is used. In most or all prior nozzles, high pressure steam issuing from the nozzle into water makes considerable noise, which is absent or greatly reduced when the nozzle of the present invention is used.

It is to be noted that no part of the nozzle above the screw threads 16 is of larger diameter than the threads. The upper part of the nozzle is all formed and shaped in such a manner that it may be readily inserted through an opening of the same diameter as the threads 16, so that the nozzle may be conveniently mounted in and extend through a single opening in the jacket, as shown in Fig. 3.

Heretofore, in prior nozzles of this general type, so far as known to applicant, the rate of heating and circulation caused by the fluid issuing from a nozzle having a series of orifices has always been controlled, if controlled at all, by regulating the amount of fluid supplied to the nozzles, and not by regulating the number of nozzle orifices which were effective to discharge fluid. This prior arrangement of regulation has a number of objections, among which may be mentioned the fact that when the supply of fluid (such as steam) is cut down, the fluid continues to flow from all of the orifices but flows at a reduced pressure and velocity, and sometimes at a velocity insufficient to cause proper circulation of the water in the jacket. It is more desirable to maintain the pressure substantially constant, and to reduce the heating effect by other means. The nozzle of the present invention provides a simple arrangement for accomplishing this, as the heating effect may be varied by increasing or decreasing the number of effective orifices through which the fluid flows, without in any way throttling down the supply of fluid to the orifices, or substantially affecting the pressure of the fluid at the orifices.

To accomplish this control, the nozzle is provided with a controlling member 50 extending upwardly through the passageway 23 and into and through the passageway 40 almost to the top thereof. The controlling member may conveniently be constructed of somewhat tubular form, as for example from a tube with a slot 51 (Fig. 5) formed along one side. The upper end of the member 40 is formed in such manner that by turning the controlling member to different positions, various orifices 42 may be selectively blocked off.

This effect may be produced by cutting the upper end of the member 50 at an oblique angle as shown at 52, with the extreme upper edge of the member 50, at the long side thereof, terminating, for example, just below the upper orifice 42, and the short side terminating, for example, just below the lowermost orifice 42.

The steam or other fluid entering the chamber 23 passes through the slot 51 into the member 50 and thence flows upwardly through the member 50 to the upper part of the passageway 40. Here, with undiminished pressure substantially unaffected by the number of orifices which may be open, it enters and passes through those nozzle orifices which are open and thus issues from the nozzle. If it is desired to have all of the nozzle orifices open, the controlling member 50 may be positioned as in Fig. 4, with its short side toward the nozzle orifices. None of the orifices will then be blocked off, and all of them will be accessible to the fluid flowing through the passageways.

If the controlling member 50 be turned slightly in either direction from the position shown in Fig. 4, a longer part of the member 50 will be brought opposite the orifices and one or more of the lowermost orifices will be blocked off. In Fig. 5, the member 50 is shown turned approximately 90° from the position of Fig. 4, and it is seen that approximately the lower half of the orifices 42 will be blocked off, leaving the remaining orifices in the upper part of the series effective for egress of fluid.

If the controlling member 50 be turned still further, approximately 180° from the position of Fig. 4, to a position such as shown in Fig. 6, then the longest part of the controlling member is opposite the nozzle orifices and blocks off the maximum number of such orifices which can be blocked off. As here constructed, all but the topmost orifice 42 will be blocked off when the parts are in the position of Fig. 6, and the steam or other fluid supplied to the passageway 23 will then flow only through the uppermost orifice 42 and will not be admitted to any of the other orifices.

By shaping the upper end of the member 50 somewhat differently than here shown, as will be obvious to those skilled in the art, the lower orifices 42 can be made to open first instead of the upper ones, or it may be constructed so that the middle orifices open first, further rotation of the member 50 being effective to open other orifices both above and below the central ones which were first opened. This latter arrangement, with the central orifices opening first, is particularly suitable where the nozzle is to project into a pipe rather than into a jacket as here shown.

When one or more of the orifices are blocked off by the member 50 as above described, the heating effect produced by the steam or other fluid will be reduced over what it would be if all of the nozzle orifices were effective. Yet it will be seen that this reduction has been accomplished without throttling down the steam supply or reducing the steam pressure, so that the steam will still flow at its undiminished normal pressure and velocity from the orifice or orifices which remain unblocked, and the high velocity of the steam will continue to circulate the water in the jacket 11 satisfactorily, even when only one or two orifices are open.

In order to turn the controlling member 50 to the various positions for selectively blocking off one or more of the orifices 42, the member 50 is preferably extended downwardly through the bottom of the nozzle body as at 55 and is there provided with an accessible handle 56. A fluid tight joint may be provided by any suitable means such as the collar 57 integral with or secured to the member 50 and engaging in a gland or stuffing box indicated diagrammatically at 58.

As shown in Fig. 3, graduations 60 are preferably provided in a readily visible position on the lower part of the nozzle casing, so that by observing the position of the handle 56 with reference to these graduations, it can be determined how many of the nozzle orifices are blocked off and how many are effective.

The nozzle is capable of use not only with a water jacket, as here shown, but also in any location or position where a nozzle would be useful for introducing heating or cooling fluid. For example, the nozzle may project into a pipe or conduit leading to a coil, and may be used to introduce steam, water, or brine into the system. If desired, the passageways 20 and 33 may be omitted entirely and all fluid may be introduced through the member 50 and orifices 42. The nozzle is here shown as applied to a jacket merely by way of example.

The jacket 11 (Fig. 1) is preferably provided with a baffle 61 immediately above the nozzle, and another baffle 62 may if desired be provided above and to one side of an outlet conduit 63 for use in draining the contents of the jacket. Other outlet conduits 64 may be provided if desired near the top of the jacket 11 for controlling the level of the liquid within the jacket. Suitable valves are provided, of course, in the water conduit 22 and the steam conduit 25.

In use, the valve in the water conduit 22 is opened so that water issues from the orifice 34 of the nozzle until the water has reached the desired level in the jacket 11, which level may be, for example, the level of the outlet conduits 64. If it is desired to cool the contents of the receptacle 10 rather than to heat them, the water controlling valve may be left open so that cold water continues to issue from the nozzle orifice 34 and circulate in the jacket 11, overflowing through the conduits 64. If heating rather than cooling is desired, however, the water controlling valve may be closed when sufficient water has been placed in the jacket, and the valve in the steam line 25 is then preferably opened wide, so that steam is supplied to the nozzle under full pressure without being throttled down by passing through a partially closed throttle valve.

For rapid heating and circulation of the water in the jacket, the control handle 56 is turned to the position shown in Figs. 3 and 4, so that the steam enters the passageway 23, flows upwardly through the member 50 and passageway 40, and issues under full pressure from all of the orifices 42. When it is desired to reduce the rate of heating, this is done not by throttling down the valve in the steam conduit 25, but on the contrary by turning the control handle 56 to any desired position to block off selectively one or more of the nozzle orifices 42, while still allowing the steam or other heating fluid to flow unobstructedly through the remaining one or more of the orifices 42 which are not blocked off. Thus it will be seen that full pressure is maintained at all times, and even when only a single orifice is effective (as in Fig. 6) nevertheless steam still flows from this orifice at full normal velocity and produces a satisfactory circulating effect in the water within the jacket.

Because of the shape of the nozzle, operation is relatively silent even when high pressure steam is used.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A fluid nozzle for immersion in a body of liquid, comprising a body having a stream-line shaped cross section rounded at one side and with a relatively thin edge at another side and having a fluid supply passageway extending through said body and a series of outlet orifices leading from said passageway and opening substantially at said thin edge, a controlling member movable within said passageway, said member having a portion for selectively covering or uncovering one or more of said orifices, and means for shifting said controlling member to control selectively the number of said orifices through which fluid may flow.

2. A nozzle comprising a body having a water supply passageway therein and an orifice leading from said passageway, a separate steam supply passageway also in said body and a series of steam outlet orifices leading from said steam supply passageway, and means operable from the exterior of said nozzle for selectively blocking off one or more of said steam orifices while leaving one or more other steam orifice substantially unobstructed for flow of steam therethrough.

3. A nozzle comprising a body having a portion formed with a substantially stream-lined cross section rounded at one side and tapering to a relatively thin edge at another side, a water supply passageway within said body, a discharge orifice opening from said water supply passageway, a steam supply passageway also within said body, a series of steam outlet orifices leading from said steam supply passageway and opening in the stream-lined portion of said body, and means rotatable within said steam passageway and operable from the exterior of said nozzle for selectively blocking off one or more of said steam orifices.

4. A fluid nozzle for immersion in liquid, comprising a body rounded on one side and tapering to a relatively thin edge along its opposite side, said body having a fluid passageway therein and a plurality of outlet orifices leading from said passageway and opening substantially at said thin edge.

5. A relatively silently operating nozzle for injecting steam into water, comprising a body having a portion to be immersed in water, said portion being of substantially stream-lined cross-section rounded on one side and tapering to a relatively thin edge along its opposite side, and having a steam supply passageway therein and a plurality of steam outlet orifices leading from said passageway and opening substantially at said thin edge.

6. A combined steam and water nozzle comprising a body having a portion formed with one side tapered to a relatively thin edge, said body having separate steam and water passageways therein, a series of steam outlet orifices leading from said steam passageway and opening substantially at said thin edge, and a water outlet orifice leading from said water passageway.

7. In a processing unit of the type including a container for holding material to be processed, and a jacket surrounding at least a part of said container and forming a fluid receiving space around said part of said container, a steam supply nozzle extending into said space, said nozzle having a series of steam outlet orifices and a steam supply passageway leading to said orifices, and means for controlling the number of said orifices through which steam may flow.

8. Apparatus constructed in accordance with claim 7, in which said means for controlling the number of orifices through which steam may flow comprises a blocking member for selectively blocking off certain of said orifices while leaving other orifices substantially unobstructed so that steam may flow through said steam passageway and through any unobstructed orifice.

9. A combined steam and water nozzle comprising a body having means for attachment to a support and having an elongated portion projecting in one direction beyond said attachment means, said body having a water passageway therein and an outlet orifice from said water passageway through a wall of said elongated portion, said body also having a steam passageway therein and a plurality of outlet orifices leading from said steam passageway through a wall of said elongated portion on the opposite side of said water outlet orifice from said attachment means, and a controlling member rotatable within said steam passageway and having an oblique edge for selectively covering or uncovering any selected number of said steam outlet orifices.

OTTO W. GREENE.